United States Patent
Johansson et al.

(10) Patent No.: US 8,527,987 B2
(45) Date of Patent: Sep. 3, 2013

(54) METHOD AND DEVICE FOR INSTALLING APPLICATIONS ON NFC-ENABLED DEVICES

(75) Inventors: Mattias Johansson, Solna (SE); Jakob Saros, Luleå (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 223 days.

(21) Appl. No.: 13/142,434

(22) PCT Filed: Dec. 29, 2008

(86) PCT No.: PCT/SE2008/051568
§ 371 (c)(1),
(2), (4) Date: Jun. 28, 2011

(87) PCT Pub. No.: WO2010/077194
PCT Pub. Date: Jul. 8, 2010

(65) Prior Publication Data
US 2011/0276961 A1    Nov. 10, 2011

(51) Int. Cl.
*G06F 9/445* (2006.01)
*H04B 5/00* (2006.01)

(52) U.S. Cl.
USPC ........... 717/178; 717/174; 717/176; 717/177; 455/41.1

(58) Field of Classification Search
USPC .................. 717/174–178; 455/41.1
See application file for complete search history.

(56) References Cited

U.S. PATENT DOCUMENTS

| 7,375,616 | B2 * | 5/2008 | Rowse et al. | 340/10.1 |
| 7,590,384 | B2 * | 9/2009 | Dawidowsky | 455/41.1 |
| 7,706,778 | B2 * | 4/2010 | Lowe | 455/411 |
| 7,734,307 | B2 * | 6/2010 | Dawidowsky | 455/522 |
| 7,899,393 | B2 * | 3/2011 | Luong | 455/41.1 |
| 7,962,369 | B2 * | 6/2011 | Rosenberg | 705/26.1 |
| 7,986,917 | B2 * | 7/2011 | Ahlgren et al. | 455/41.2 |
| 8,005,426 | B2 * | 8/2011 | Huomo et al. | 455/41.2 |

(Continued)

FOREIGN PATENT DOCUMENTS

| EP | 1914631 A1 | 4/2008 |
| EP | 2152021 A1 | 2/2010 |

(Continued)

OTHER PUBLICATIONS

Dominikus et al., "mCoupons: An Application for Near Field Communication (NFC)," 2007, IEEE.*

(Continued)

*Primary Examiner* — Qing Chen
(74) *Attorney, Agent, or Firm* — Coats & Bennett, P.L.L.C.

(57) ABSTRACT

The invention relates to a method for installing a target application on an NFC-enabled device, such as an NFC-enabled mobile phone. If the NFC-enabled device is unable to identify or find the target application associated with a Target Identifier (Target ID) in a received Generic Control record, a look-up table in which Target IDs are associated with target URIs from which installation files for the target applications of the Target IDs can be downloaded is used to retrieve the target URI of the Target ID in the received Generic Control record. One or several installation files for the target application are then downloaded from the retrieved target URI, whereupon the target application of the Target ID in the received Generic Control record is installed on the NFC-enabled device using the downloaded installation file(s).

18 Claims, 7 Drawing Sheets

(56) References Cited

U.S. PATENT DOCUMENTS

| | | | |
|---|---|---|---|
| 8,059,683 B2* | 11/2011 | Arunan | 370/471 |
| 8,140,010 B2* | 3/2012 | Symons et al. | 455/41.1 |
| 2003/0046676 A1* | 3/2003 | Cheng et al. | 717/173 |
| 2006/0044153 A1* | 3/2006 | Dawidowsky | 340/825.22 |
| 2006/0052055 A1* | 3/2006 | Rowse et al. | 455/41.1 |
| 2006/0080321 A1* | 4/2006 | Horn et al. | 707/10 |
| 2006/0094356 A1* | 5/2006 | Dawidowsky | 455/41.1 |
| 2006/0224901 A1* | 10/2006 | Lowe | 713/186 |
| 2007/0019616 A1 | 1/2007 | Rantapuska et al. | |
| 2007/0194945 A1* | 8/2007 | Atkinson | 340/825.72 |
| 2008/0039212 A1* | 2/2008 | Ahlgren et al. | 463/46 |
| 2008/0238610 A1* | 10/2008 | Rosenberg | 340/5.7 |
| 2008/0280558 A1* | 11/2008 | Arunan | 455/41.1 |
| 2009/0004969 A1* | 1/2009 | Luong | 455/41.1 |
| 2009/0098825 A1* | 4/2009 | Huomo et al. | 455/41.1 |
| 2010/0015917 A1* | 1/2010 | Symons et al. | 455/41.1 |
| 2011/0253781 A1 | 10/2011 | Matsuo | |

FOREIGN PATENT DOCUMENTS

| | | |
|---|---|---|
| JP | 2007135054 A | 5/2007 |
| JP | 2007183780 A | 7/2007 |
| JP | 2008165736 A | 7/2008 |
| WO | 2008/027620 A1 | 3/2008 |
| WO | 2008/042302 A2 | 4/2008 |
| WO | 2008/056210 A1 | 5/2008 |
| WO | 2008146840 A1 | 12/2008 |

OTHER PUBLICATIONS

Madlmayr et al., "The benefit of using SIM application toolkit in the context of near field communication applications," 2007, IEEE.*

Ortiz, C. Enrique, "An Introduction to Near-Field Communication and the Contactless Communication API," <http://www.oracle.com/technetwork/articles/javame/nfc-140183.html>, Jun. 2008, Oracle.*

Madlmayr, Gerald, "A mobile trusted computing architecture for a Near Field Communication ecosystem," Nov. 2008, ACM, p. 563-566.*

Remédios et al., "NFC Technologies in Mobile Phones and Emerging Applications," 2006, Information Technology for Balanced Manufacturing Systems, p. 425-434.*

Author Unknown. "Java 2 Platform, Micro Edition Content Handler API Specification (CHAPl)." Final Release, Version 1.0, Santa Clara, California, US, Jun. 3, 2005.

* cited by examiner

Fig. 1A – PRIOR ART
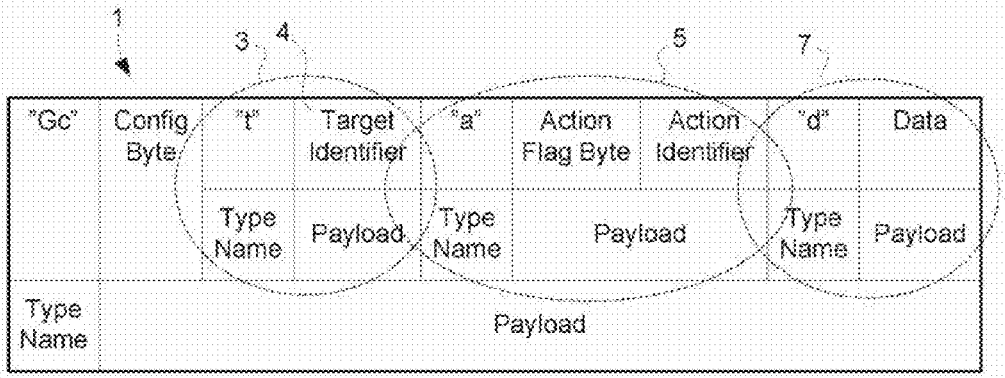
Fig. 1B – PRIOR ART
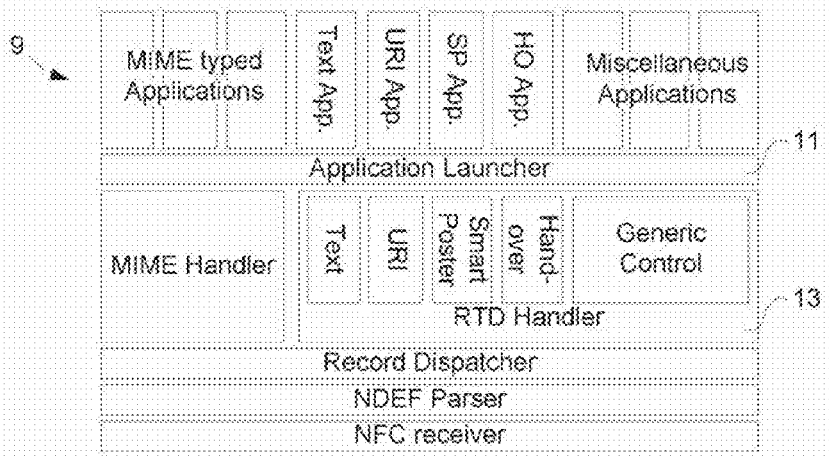

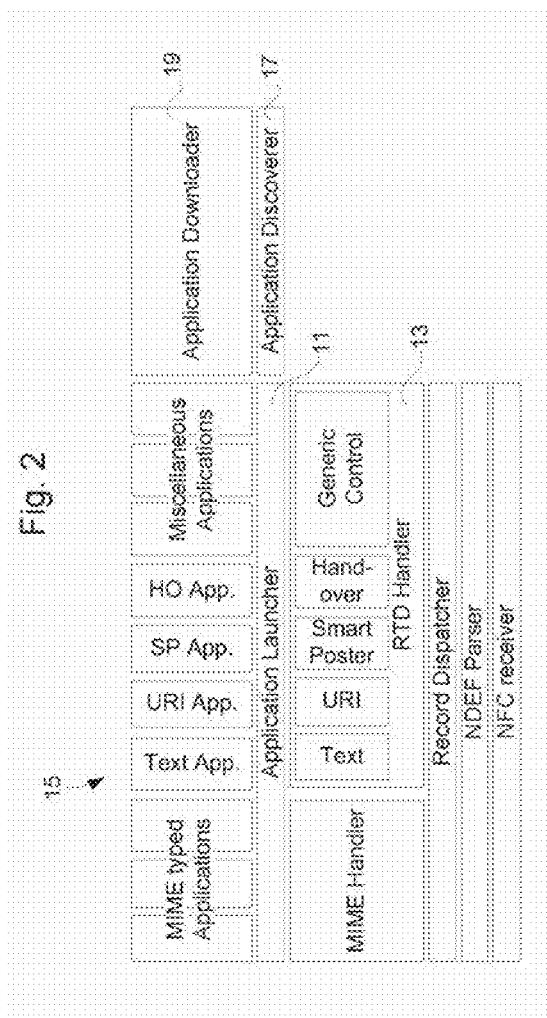

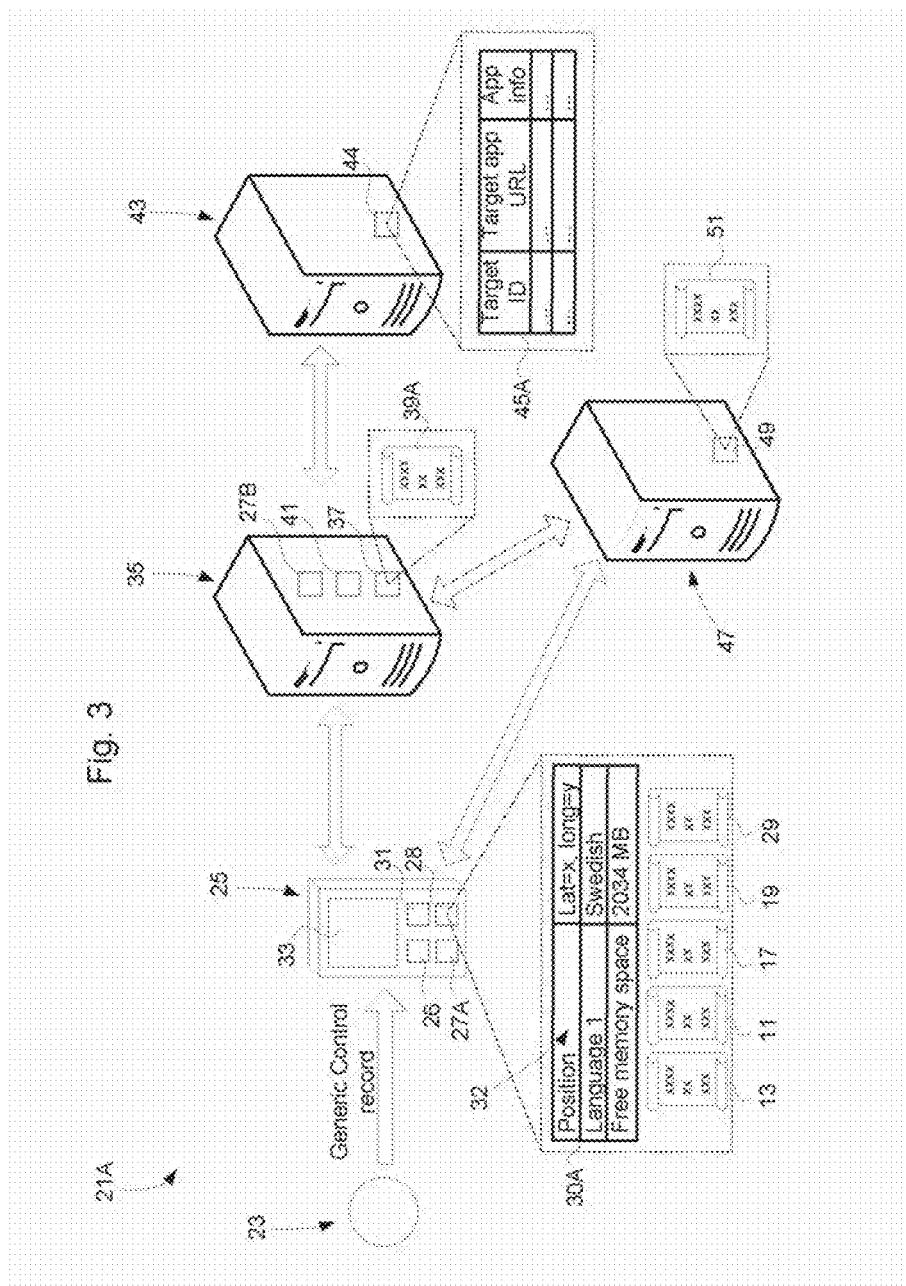

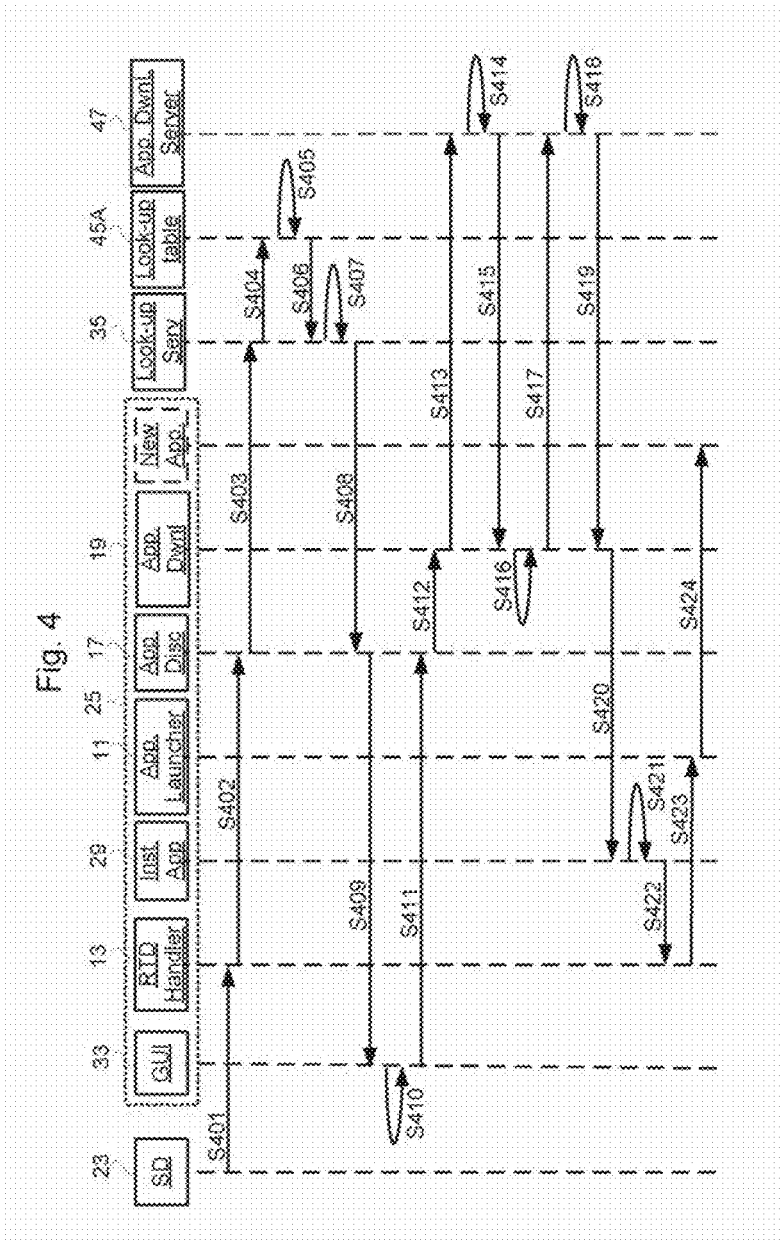

METHOD AND DEVICE FOR INSTALLING APPLICATIONS ON NFC-ENABLED DEVICES

TECHNICAL FIELD

The invention relates to the field of Near Field Communication (NFC), and in particular to a method for installing applications on an NFC-enabled device.

BACKGROUND

Near Field Communication (NFC) is a radio frequency (RF) technology allowing electronic devices equipped with NFC communication modules comprising a transmitter and/or a receiver to communicate with each other over short ranges. Electronic devices adapted for NFC communication is often referred to as NFC-enabled devices.

Today, NFC technology is primarily used to connect electronic devices, access digital content, admission control to specific premises, and make contactless transactions. For example, NFC can be used to connect wireless components in a home office system or a headset with a mobile phone, to read a "smart" poster embedded with an RF tag and to pay for tickets, access or other products using an NFC-enabled mobile phone.

The NFC Forum is an organization that promotes the use of NFC technology in consumer electronics, mobile devices, and PCs by providing a framework for NFC application development and interoperability between NFC-enabled devices. The NFC Forum develops standards-based specifications that define NFC device architecture and protocols for interoperability.

The NFC Forum has specified a message format definition referred to as the Generic Control Record Type Definition (Generic Control RTD) in order to provide a way to request any specific action to an NFC-enabled device (a destination device) from another NFC-enabled device, a tag or a card (source device) through NFC communication. One purpose of the Generic Control RTD is to avoid that NFC application/service providers create their own record types which may give rise to incompatibility issues and increase the complexity of NFC-enabled devices as they would have to be adapted to handle different types of message formats.

A Generic Control record comprises a Target record, an Action record and a Data record. The content of the Target record, normally referred to as the Target Identifier, identifies a function or application to process the data contained in the Data record. The function/application identified by a Target Identifier will in this document be referred to as the target application of that Target Identifier. The content of the Action record specifies for the target application the desired action to be applied to the data in the Data record. Thus, when a Generic Control record is received by a destination device, the destination device launches the target application of the Target Identifier in the received Generic Control record.

The Generic Control RTD assumes that the destination device is able to identify the target application of the Target Identifier in a received Generic Control record and that the target application is installed on the destination device. If the destination device is unable to identify or find the requested target application, the specification says that the device should simply ignore the Generic Control record.

In reality this may pose significant problems as NFC-enabled devices may be unable to communicate with other NFC-enabled devices or to interpret tags or cards from which they receive Generic Control records. These problems may delay or even prevent adoption of NFC technology since end-users may not be able to benefit from available NFC services as they may not know which application is needed or how to obtain the application needed to use a particular NFC service. Furthermore, this restriction in the specification poses a problem to NFC service providers as it is difficult to distribute the application needed to use a new service to all potential end-users. Thus, NFC service providers may experience problems in getting new NFC services out on the market, which further delays adoption of NFC technology.

SUMMARY

The invention addresses the problem of how to improve the functionality of NFC-enabled devices.

The invention relates to a method for installing an application on an NFC-enabled device, such as an NFC-enabled mobile phone. The method comprises the steps of receiving, in the NFC-enabled device, a Generic Control record comprising a Target Identifier (Target ID) which is associated with a target application, from a source device;

retrieving, from a look-up table in which at least one Target ID is associated with at least one target URI, e.g. a URL, from which at least one installation file for the target application associated with the at least one Target ID can be downloaded, at least one target URI associated with the Target ID in the received Generic Control record by providing this Target ID as input to the look-up table;

downloading, to the NFC-enabled device, at least one installation file for the target application from the retrieved target URI, and installing the target application on the NFC-enabled device using the at least one installation file.

The method hence allows a needed target application to be installed on an NFC-enabled device when the NFC-enabled device (the destination device) receives a Generic Control record from a source device, such as a tag, a card or another NFC-enabled device. Thus, instead of simply ignoring a Generic Control record targeting an unknown application or functionality, the application/functionality required by the NFC-enabled device to process the data in the Generic Control record is retrieved and installed on the device. Hence users may obtain the application needed to use a particular NFC service even though they may not know which application is needed or how it shall be installed.

The method increases the user-perceived quality of NFC services since the end-user will, at least less often, experience that his/her NFC-enabled device is unable to understand the data received from a source devices. Furthermore, the method encourages the development of new NFC services since the problem of distributing the applications needed to use a new NFC service is solved or at least mitigated. When an end-user brings his/her NFC-enabled device in the proximity of a source device in order to benefit from a new service, the application needed to use the service can be automatically or semi-automatically installed on the NFC-enabled device without the service provider having to actively distribute the application to the NFC-enabled device. The only thing required by the service provider when introducing a new NFC service to the market is to make sure that the source devices used in the service are configured to transmit Generic Control records comprising a certain Target ID, and to register that Target ID in the look-up table along with a target URI from which the installation file or files for the application needed to use the new service are downloadable.

According to an aspect of the invention, the at least one Target ID in the look-up table is associated with a plurality of target URIs of which at least one is associated with application-related information being descriptive of the target application whose at least one installation file is downloadable from that target URI and/or descriptive of the at least one installation file itself. In this case, the step of retrieving the at least one target URI advantageously comprises the steps of:

provide contextual information about the NFC-enabled device and/or the user of the NFC-enabled device as input to the look-up table to allow the contextual information to be matched with the application-related information, and retrieving, from the look-up table, at least one target URI that is associated with application-related information which, at least to some extent, is found to match the contextual information.

When there are several target applications or target application versions associated with the same Target ID, this feature allows the most suitable application or application version to be installed on the NFC-enabled device based on contextual information about the NFC-enabled device and/or the user of the NFC-enabled device. For example, the contextual information may include information indicating that Swedish is the preferred language of the user, which information can be retrieved by the NFC-enabled device from, e.g., preset user preferences. If the application-related information of any of the target URIs that are associated with the Target ID in the received Generic Control record indicates that the target application/target application version that is downloadable from that target URI supports Swedish language, the target URI from which that particular target application/target application version can be downloaded is retrieved from the look-up table.

According to an aspect of the invention, the look-up table comprises a server-side look-up table stored in a network node which herein is referred to as a Look-up server, or in another network node to which the Look-up server is communicatively connected. In this case, the Target ID in the Generic Control record received by the NFC-enabled device can be provided as input to the look-up server by transmitting a look-up request including the Target ID from the NFC-enabled device to the Look-up server. Moreover, the step of providing the contextual information about the NFC-enabled device and/or the user of the NFC-enabled device as input to the look-up table can in this case comprise the steps of retrieving the contextual information from an internal register within the NFC-enabled device and sending it from the NFC-enabled device to the Look-up server, either in a separate transmission or included in the look-up request.

There are, however, other ways to allow contextual information about the NFC-enabled device and/or the user of the NFC-enabled device to be matched with application-related information in the look-up table when the look-up table resides in the Look-up server or another network node to which the Look-up server is communicatively connected. For example, when the NFC-enabled device is connected to a network in which a network node registers contextual information about user devices connected to the network and/or the users of these user devices, the step of providing the contextual information as input to the server-side look-up table can be performed by sending the contextual information from this network node to the Look-up server. Such a network node adapted to register contextual information about user devices and/or their users will hereinafter be referred to as a context broker node.

According to another aspect of the invention, the look-up table comprises both a server-side look-up table as described above and a local client-side look-up table stored in the NFC-enabled device, in which case, the target URI of an unknown Target ID can be retrieved by the NFC-enabled device from the client-side look-up table. This is advantageous in that the NFC-enabled device do not have to look externally for the URI from which the needed target application can be downloaded by sending a look-up request to the Look-up server, thus saving bandwidth in the uplink from user devices to the Look-up server.

Preferably, the client-side look-up table can be updated by inserting thereto Target IDs and target URIs associated therewith received in the NFC-enabled device from the Look-up server, which Target IDs and target URIs has been retrieved by the Look-up server from the server-side look-up table. Preferably, also application-related information associated with the respective target URI in the server-side look-up table is sent to the NFC-enabled device from the Look-up server to be inserted in the client-side look-up table along with the Target ID/target URI pairs.

The update of the client-side look-up table can be initiated by the NFC-enabled device itself by sending an update request to the Look-up server. Preferably, contextual information about the NFC-enabled device and/or the user of the NFC-enabled device is included in the update request to allow the Look-up server to determine which information to return to the NFC-enabled device by matching this contextual information with application-related information associated with the respective target URIs in the server-side look-up table.

However, the update of the client-side look-up table can also be performed by pushing Target ID/target URI pairs and preferably also additional application-related information associated with the target URI in these pairs from the Look-up server to the destination device. As mentioned above, the Look-up server may be communicatively connected to a context broker node in or connectable to a network to which the NFC-enabled device is connected, in which case contextual information about the NFC-enabled device can be received by the Look-up server from the context broker node in order for the Look-up server to determine which information to push to the NFC-enabled device by matching contextual information with application-related information as described above.

When the NFC-enabled device comprises a client-side look-up table which can be updated with information received from the Look-up server, the Look-up server is preferably adapted to store a copy of the client-side look-up table in order to know what target ID/target URI pairs are stored therein. This is useful in order for the Look-up server not to repeatedly retransmit Target ID/target URI pairs already stored in the client-side look-up table to the destination device.

Furthermore, no matter whether the NFC-enabled device comprises a local client-side look-up table or not, the Look-up server can be adapted to store a user profile for each NFC-enabled device to which it can transmit target URIs. Such a user profile may comprise a copy of a local client-side look-up table stored in the NFC-enabled device, information about which applications are currently installed on the NFC-enabled device, and contextual information about the NFC-enabled device and/or the user of the NFC-enabled device, which contextual information can be retrieved by the Look-up server either from the NFC-enabled devices themselves or a context broker node as described above. The user profiles can be used by the Look-up server when selecting which target URI(s) should be sent to a particular NFC-enabled device.

The invention also relates to An NFC-enabled device, such as an NFC-enabled mobile phone, comprising an NFC communication unit which is adapted to receive, from a source device, a Generic Control record that comprises a Target ID associated with a target application. The NFC-enabled device also comprises a network communication module adapted to send and receive data to/from nodes in a network to which the device is connectable, and an application installer function adapted to install applications on the device. The NFC-enabled device is characterized in that it further comprises:

an application discoverer function adapted to retrieve, from a look-up table in which at least one Target ID is associated with at least one target URI, e.g. a URL, from which at least one installation file for the target application associated with the at least one Target ID can be downloaded, at least one target URI associated with the Target ID in the received Generic Control record by providing the Target ID as input to the look-up table, and an application downloader function adapted to download at least one installation file for the target application from the retrieved target URI, and in that the application installer function is adapted to install the target application on the NFC-enabled device using the at least one downloaded installation file.

Thus, the NFC-enabled device is able to retrieve and install the application needed to process the data in a received Generic Control record if the application is not already installed on the device.

The invention also relates to a computer program for NFC-enabled devices. This computer program comprises computer readable code means which, when run on an NFC-enabled device having received a Generic Control record comprising a Target ID associated with a target application from a source device, causes the NFC-enabled device to perform the following actions:

retrieve, from a look-up table in which at least one Target ID is associated with at least one target URI from which at least one installation file for the target application associated with the at least one Target ID can be downloaded, at least one target URI associated with the Target ID in the received Generic Control record by providing the Target as input to the look-up table, and download at least one installation file for the target application from the retrieved target URI.

Furthermore, the invention relates to a computer program product comprising the computer program for NFC-enabled devices described above and a computer readable medium on which the computer program is stored.

The invention also relates to a computer program for a server node which is herein referred to as the Look-up server. This computer program comprises computer readable code means which, when run on a server computer having received a look-up request including a Target ID associated with a target application from an NFC-enabled device, causes the server computer to retrieve, from a look-up table in which at least one Target ID is associated with at least one target URI from which at least one installation file for the target application associated with the at least one Target ID can be downloaded, at least one target URI associated with the Target ID in the received look-up request, and to send the at least one retrieved target URI to the NFC-enabled device.

The invention also relates to a server node comprising a network communication unit adapted to send and receive data to/from nodes in a network to which the server node is connectable. The server node also comprises a computer readable medium for storing computer program components thereon, and processing means for running the computer program components. The server node is characterized in that the computer readable medium stores the Look-up server computer program described above, thus making the server node a Look-up server.

More advantageous features of the method, apparatuses and computer programs according to the invention will be described in the detailed description following hereinafter and in the appended claims.

BRIEF DESCRIPTION OF THE DRAWINGS

The objects, advantages and effects as well as features of the invention will be more readily understood from the following detailed description of exemplary embodiments of the invention when read together with the accompanying drawings, in which:

FIG. 1A illustrates the structure of a Generic Control record as defined by the Near Field Communication (NFC) Forum in the Generic Control Record Type Definition (Generic Control RTD);

FIG. 1B illustrates a Record Handling Architecture (RHA) according to prior art as defined by the NFC Forum;

FIG. 2 illustrates an Extended RHA according to an exemplary embodiment of the invention;

FIG. 3 illustrates a system for implementing the invention according to an exemplary embodiment;

FIG. 4 shows a signaling scheme illustrating how the different system components of the system illustrated in FIG. 3 may be configured to communicate according an exemplary embodiment of the invention;

DETAILED DESCRIPTION

Figure 5:
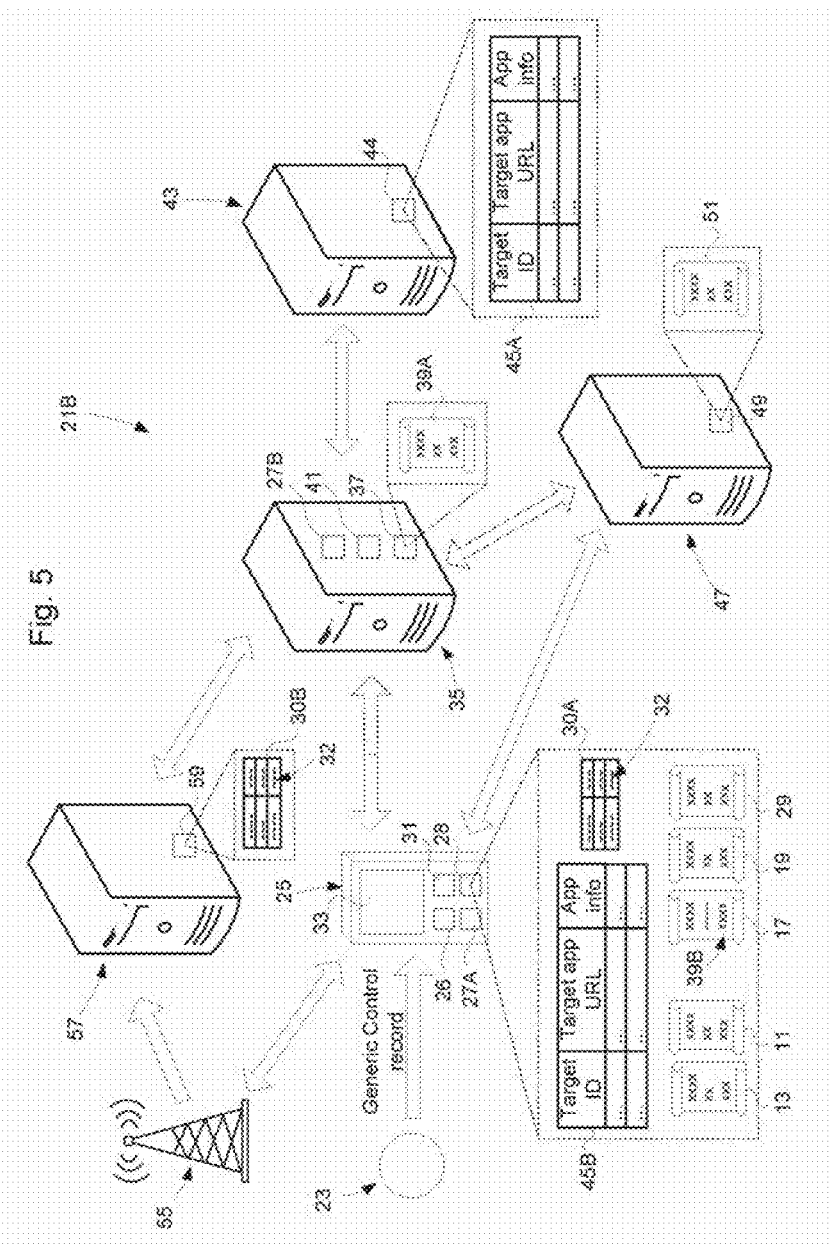
FIG. 5 illustrates a system for implementing the invention according to another exemplary embodiment.

FIG. 1A illustrates the structure of a Generic Control record 1 as defined by NFC Forum in the Generic Control RTD.

A Generic Control record is an instance of an NDEF (NFC Data Exchange Format) message. The content of the Generic Control record payload consists of a Configuration Byte and several NDEF sub-records of the types Target record, Action record and Data record. In conclusion, the Generic Control record 1 comprises the following components:

A Configuration Byte for specifying several profiles to help determine how to handle the rest of the payload.

A Target record 3 for identifying an application or function to handle the data contained in the Generic Control record 1. The application or function to handle the data is identified by a parameter of the Target record 3 normally referred to as the Target Identifier 4. This parameter will throughout this document be referred to as the Target ID 4 and the application/function that is identified by the Target ID 4 will be referred to as the target application of that Target ID.

An Action record 5 for specifying the desired action to be applied to the data by the target application.

A Data record 7 for specifying data to be processed by the target application.

FIG. 1B illustrates a Record Handling Architecture (RHA) 9 according to prior art as defined by the NFC Forum. The RHA 9 should be implemented by a destination device and is used to launch the appropriate target application indicated by the Target ID 4 in the Generic Control record 1. Once a record type is identified by an NDEF parser, the record data is forwarded to a record dispatcher and the record dispatcher determines which handler will take care of the record. After the association between the data and a corresponding application (or function) is resolved by a handler, the Application Launcher 11 launches the associated application and, if necessary, delivers the data of the Data record 7 to the application. Which handler should take care of the data record depends on the record type. A MIME (Multipurpose Internet Mail Extensions) handler is used for MIME-type records and an RTD Handler 13 for NFC Forum Global Type records.

FIG. 2 illustrates an "Extended Record Handling Architecture" (E-RHA) 15 according to the invention. The E-RHA 15 comprises an Application Discoverer function 17 and an Application Downloader function 19. These functions 17, 19 provide a look-up service allowing the destination device to find and download a target application of a Target ID 4 in a received Generic Control record 1 if not already installed on the destination device. Thus, the E-RHA 15 provides a back-end resolution service allowing the destination device to retrieve the functionality required to process data received in a Generic Control record 1 which previously would have been deemed uninterpretable by the destination device and therefore ignored.

If the RTD Handler 13 cannot find the target application indicated by the Target ID 4 in a received Generic Control record 1, it launches the Application Discoverer 17. To find the appropriate target application, the Application Discoverer 17 uses one or several look-up tables which keep a register of applications and where they are hosted by associatively storing Target IDs 4 and URIs (Uniform Resource Identifiers), such a URLs (Uniform Resource Locators). From each URI associated with a Target ID, one or several installation files of the target application of that Target ID 4 can be downloaded. An URI associated with a Target ID 4 in such a look-up table, and thus allegedly hosting one or several installation files for the target application of that Target ID 4, will hereinafter be referred to as a target URI of that Target ID. When the target URI of the Target ID 4 in the received Generic Control record 1 is retrieved by the Application Discoverer 17 from the look-up table, the Application Downloader 19 downloads the target application installation file(s) from the retrieved target URI. The target application can then be installed and launched by the Application Launcher 11, additionally with help from whatever native device installation program is available on the destination device.

FIG. 3 illustrates an exemplary system 21A for implementing the proposed look-up service allowing NFC-enabled devices to install previously non-installed target applications of Target IDs 4 in received Generic Control records 1 according to an embodiment of the invention.

In FIG. 3, the system 21A is seen to comprise a source device 23 which in this exemplary case is an NFC tag. The source device 23 could also be an NFC card or an NFC-enabled device, such as a mobile phone, a Personal Digital Assistant (PDA) or a conventional computer equipped with Radio Frequency (RF) circuitry for supporting NFC.

The system 21A further comprises an NFC-enabled device 25 in form of an NFC-enabled mobile phone, hereinafter in the description called the destination device. The destination device could, however, be any of the above mentioned types of NFC-enabled devices. The destination device comprises an NFC communication unit 26 supporting communication with other NFC devices according to the NFC Forum standard (ISO 18092, ISO 14443A and/or 14443B). The NFC communication unit 26 may be an NFC receiver unit only allowing the destination device to receive Generic Control records 1 from nearby NFC devices, or it may be an NFC transceiver unit allowing the destination device both to receive and transmit Generic Control records 1 from/to nearby NFC devices.

The destination device further comprises a communication unit 27A which may comprise any communication means adapted for wired or wireless transmission and/or reception of data. For example, the network communication unit 27A can comprise an Ethernet module supporting connection to the Internet via a wired or wireless (e.g. IEEE 802.11x) Ethernet connection, a bluetooth transceiver module, an infrared transceiver module, a GPS (Global Positioning System) receiver, etc. In this exemplary case in which the destination device is an NFC-enabled mobile phone, the network communication unit 27A also comprises RF (Radio Frequency) circuitry for communicating with a mobile communications network, such as a GSM (Global System for Mobile communications), WiMax (Worldwide Interoperability for Microwave Access), UMTS (Universal Mobile Telecommunications System) or LTE/SAE (Long Term Evolution/System Architecture Evolution) network, in which case the destination device can access the Internet also via the mobile communication network.

The destination device further comprises a computer readable medium 28 which stores the applications/functions of the E-RHA 15 illustrated in FIG. 2 in form of computer program components. Some of these components, namely the RTD Handler 13, the Application Launcher 11, the Application Discoverer 17 and the Application Downloader 19 are shown in a dashed rectangle figuratively illustrating a portion of the computer readable medium 28. Also seen stored in the computer readable medium 28 is a computer program component 29 representing an Application Installer function 29 which could be a native device installation program or an application installer function especially developed to install target applications downloaded by the Application Downloader 19.

The computer readable medium 28 further stores a register 30A of contextual information 32 about the destination device and/or the user of the destination device. As will be described in more detail below, this information 32 can be used to retrieve the target URI hosting the installation file(s) of the most appropriate target application from the look-up table if the look-up table used by the Application Discoverer 17 stores more than one target URI associated with the Target ID 4 of a received Generic Control record 1. Any information about the destination device and/or the user of the destination device that is available in or obtainable by the destination device can be used for this purpose. In this exemplary embodiment, the contextual information 32 in the register 30A includes positional information indicating the current position of the destination device, the preferred language of the user of the destination device, and the free (available) memory space in the destination device. The positional information may be GPS coordinates obtained from a GPS receiver included in the communication unit 27A but may also be one or more Cell IDs of one or more RBSs (Radio Base Stations) to which the mobile phone currently is connected. As well known in the art, such Cell IDs can be transformed to positional information indicating the geographical position of the mobile phone. The preferred language of the user of the destination device is typically set by the user when configuring the destination device but may also be "guessed" by the destination device based on the language settings in applications installed on the device, the addresses in a contact list stored on the device, etc. The currently available memory space and other device-specific information may be obtained from various native device management functions, such as a memory management function. Although shown as stored in a common register 30A it should be appreciated that the contextual information 32 about the destination device and/or the user of the destination device may be provided by various applications and/or different device management functions of the destination device and that the register 30A hence may be a "distributed register" comprising separate registers managed by different applications/functions within the destination device. Therefore, when stating herein that contextual information 32 about the destination device and/or the user of the destination device is retrieved from the register 30A, it should be understood that this action is not limited to retrieval of information from a single register storing all available contextual information, but that the retrieval may be performed by retrieving the contextual information directly from a GPS receiver in the destination device, a memory management function in the destination device, the contact list of the destination device, or from any other application/function thereof.

The computer readable medium 28 could be any digital storage medium known in the art, such as a ROM (Read-only memory), a Flash memory, or the like. The destination device also comprises a processing means 31, such as a microprocessor, for running the computer program components 11, 13, 17, 19, 29 stored in the computer readable medium 28. The destination device further comprises a user interface 33 which in this case is a Graphical User Interface (GUI) allowing a user of the destination device 19 to interact therewith.

The system 21A further comprises a Look-up server 35 which also comprises a network communication unit 27B including communication means allowing the Look-up server 35 to communicate with the destination device and other nodes in a network to which the Look-up server 35 is connected. Typically, the communication unit 27B comprises an Ethernet module supporting connection to the Internet via a wired or wireless Ethernet connection. The Look-up server 35 further comprises a computer readable medium 37, such as a conventional hard disk drive, in which it stores a look-up function 39A in form of a computer program component. The Look-up server 35 also comprises a processing means 41, such as a micro-processor, for executing the Look-up function 41.

When the destination device receives a Generic Control record 1 comprising a Target ID 4 from the source device 23, the RTD Handler 13 searches for the target application of that Target ID 4 among the applications that are available (installed) on the destination device. If the RTD Handler cannot find the target application or is unable to identify the target application based on the Target ID 4, it launches the Application Discoverer 17. The Application Discoverer 17 then connects to the Look-up server 35 using a preferred network connection and asks the Look-up server 35 about which application is associated with the Target ID 4 in the received Generic Control record 1. In this embodiment, this is achieved by the Application Discoverer 17 by calling the look-up function 39A in the Look-up server 35, e.g. using a simple HTTP GET or POST request, with the Target ID 4 as argument. The request sent from the destination device to the Look-up server 35 will hereinafter be referred to as the look-up request. Additionally, the look-up request may include contextual information 32 about the destination device and/or the user of the destination device. The contextual information 32 can, as will be described below, be used by the look-up function 39A to return the target URI hosting the installation file(s) of the most appropriate target application or target application version to the destination device if the look-up function 39A finds more than one target URI of the Target ID 4 in the look-up request.

The Look-up server 35 is communicatively connected to at least one Application Database server 43 which stores, in a computer readable medium 44, a look-up table 45A, such as a SQL database table, keeping track of locations from which different applications intended for NFC-enabled devices are downloadable. The look-up table 45A stores different Target IDs 4 ('Target ID') associated with different target URIs ('Target app URL') from which the installation file(s) for the target application of the Target ID 4 associated with that target URI can be downloaded.

Although the target URIs in the look-up table 45A hereinafter will be assumed to be URLs, it should be appreciated that the target URIs may be any type of resource locator identifier pointing to a location from which a target application of a particular Target ID 4 can be found and downloaded by the destination device. For example, the target URIs could be HTTP addresses, FTP addresses, and/or SIP (Session Initiation Protocol) URIs.

Preferably but not necessarily, each Target ID 4 in the look-up table 45A is associated with at least one target URL. The look-up table 45A may also associate each target URL with information ('App info') describing the target application/target application version that is downloadable from that target URL and/or the target application installation file(s). Such information being descriptive of a target application will hereinafter be referred to as application-related information. The application-related information may, for example, include the name of the application, information about which operating system(s) the application is intended for, which language(s) is used/supported by the application, which geographical locations are targeted by the application, the memory space required by the application, whether the application has been signed by a certificate, the name of the publisher and/or developer of the target application, a free-text description of the application, the file size of the target application installation file(s), the file type(s) of the target application installation file(s) etc.

Although stored in a separate server node in form of an Application Database server 43 in this exemplary embodiment, the look-up table 45A could, of course, be stored locally in the Look-up server 35 itself, or be distributed among a plurality of Database servers to which the Look-up server 35 is connected. Also, the Application Database server 43 could be a VDS (Virtual Dedicated Server) residing in the same physical server as the Look-up server 35.

When the look-up function 39A receives a look-up request including a Target ID 4 from the Application Discoverer 17 of the destination device, it sends a database query to the Application Database server 43 asking the Application Database server to return the target URL(s) of the Target ID 4, and the application-related information associated with the respective URL. The target URLs and the application-related information of each URL returned to the Look-up server 35 by the Application Database server 43 in response to the database query can be said to constitute a raw matching result for a particular Target ID. According to an aspect of the invention, the look-up function 39A of the Look-up server 35 is adapted to simply forward this raw matching result to the destination device in order for the user of the destination device to select which target application he/she wants to download, and thus which target URL the destination device should connect to, based on the application-related information of each target URL. This may be achieved by the Application Discoverer 17 by displaying the received matching result to the user using, e.g., a web browser installed on the destination device.

According to another aspect of the invention, the look-up function 39A is adapted to rate the target URLs in the raw matching result by matching the application-related information associated with each target URL with the contextual information 32 of the user/destination device included in the look-up request. It should thus be understood that the rating of a target URL is de facto a rating of the target application whose installation file(s) is downloadable from that target URL and/or the installation file(s) itself and that the rating can be seen as a measure of the likelihood that the target application and/or the installation file(s) for the target application is compatible with the destination device and the configuration of the destination device, and/or the likelihood that the target application fulfills the user's requirements on the service provided by the target application. For example, if the raw matching result comprises two target URLs which, according to the application-related information associated therewith, seem to host equivalent target application versions besides that one supports Swedish language while the other does not, the look-up function 39A can be adapted to rate the target URL from which the version supporting Swedish language can be downloaded higher if the contextual information about the user/destination device indicates that Swedish is a preferred language of the user. The look-up function 39A can then be adapted to refine the raw matching result based on the ratings of the target URLs by, e.g., remove target URLs with low rating from the raw matching result set and order the remaining target URLs in a list sorted by rating. The refined matching result is then returned to the destination device by the look-up function 39A in order for the user of the destination device to select which target application he/she wants to download based on the rating and/or the application-related information of each target URL. The rating functionality allowing the target URLs in the raw matching result to be rated by matching the contextual information 32 about the user/destination device included in the look-up request with the application-related information associated with each target URL may also reside in the Application Database server 43, in which case the look-up function 39A in the Look-up server 35 can be adapted to include also the contextual information 32 in the database query transmitted to the Application Database server 43.

The system 21A typically comprises a plurality of Application Download servers 47 of which only one is shown. An Application Download server 47 is any server hosting a target URL stored in the look-up table 45A, and thus a server allegedly storing the file or files needed to install the target application of the Target ID 4 with which the target URL is associated in the look-up table 45A. An Application Download server 47 can be anything from a small home server located in a private house and storing a single NFC application to a huge server located in a server room of a company specialized in NFC application development and storing a great number of NFC applications. The Application server 47 is seen to comprise a computer readable medium 49 in which at least one installation file 51 for a target application is stored. An installation file or files of a target application should herein be construed as any file or files which with or without the necessity of first performing a formal installation procedure allows the target application to be executed on the destination device when downloaded thereto.

When the user of the destination device chooses a target URL to download the target application from, e.g. by clicking on a link displayed in the web browser of the destination device and leading to the target URL, the Application Discoverer 17 launches the Application Downloader 19 and submits the chosen target URL thereto. The Application Downloader 19 reads the target URL and opens up a network connection to the Application Download server 47 hosting the target URL using a preferred connection. The Application Downloader 19 then transmits a download request to the Application Download server 47 and downloads the target application installation file(s) 51 there from.

The Application Downloader 19 may be adapted to check that the Application Download server 47 is hosting a valid target application/target application version. This may be achieved by matching the application-related information received by the destination device from the Look-up server 35 in response to the look-up request with information relating to the target application/target application version and/or the target installation application file(s), which information may be separately stored in the Application Download server 47 and/or directly derivable from the target application installation file(s) 51. The Application Downloader 19 can be adapted to retrieve this information from the Application Download server 47 and compare it with the application-related information received from the Look-up server 35. If these pieces of information matches each other, e.g. if the target application file size and the publisher of the target application are the same according to both pieces of information, the Application Downloader 19 downloads the target application installation file(s) 51. If, however, the pieces of information differ in some aspects, the Application Downloader 19 can be adapted to abort the download procedure or ask the user whether he/she still wants to download the installation file(s) 51 by, e.g., displaying a message asking the user to select whether he/she wants to download or abort based on the detected difference in information.

When the target application installation file(s) 51 is downloaded to the destination device, the Application Downloader 17 launches the installation function 29 and instructs it to install the target application using the downloaded installation file(s) 51. As aforementioned, the installation function 29 is typically a conventional installation program, sometimes referred to as a general-purpose installer or dedicated installer, already existing in the destination device. However, the installation function 29 may also be an installation function included in the Application Downloader 19 allowing the Application Downloader 19 to install the target application using the downloaded installation file(s) 51 itself. When the target application is installed on the destination device, the installation function 29 notifies the RTD Handler 13 which in turn can alert the Application Launcher 11 to launch the newly installed target application and deliver the content of the Action 5 and Data 7 records in the received Generic Control record 1 to the target application such that the target application can perform the action requested in the Action record 5 on the data content in the Data record 7.

The proposed principle for installing a needed NFC application on an NFC-enabled device solves or at least mitigates the problem of distributing applications needed to use new NFC services. The only thing required by a service provider when introducing a new NFC service to the market is to make sure that the source devices used in the service are configured to transmit Generic Control records comprising a certain Target ID, and to register that Target ID in the look-up table 45A along with a target URL from which the installation file or files for the application needed to use the new service are downloadable. Preferably but not necessarily, the service provider also submits application-related information describing the application and/or installation file(s) to the look-up table 45A. According to an aspect of the invention, registration of a new application can be performed by an NFC service provider by sending the Target ID, target URL and the application-related information of the new application to the Look-up server 35 which in turn is adapted to insert the information into the look-up table 45 and notify the service provider when done. The dashed double arrow between the Look-up server 35 and the Application Download server 47 indicates such a registration of the target application whose installation file or files 51 are downloadable from the Application Download server 47. Thus, in this case, it is assumed that registration of the new application is performed from the server computer storing the installation file(s) for the new application. Of course, registration can be performed from another computer/device than the computer/device actually storing the installation file(s).

As well known in the art, applications do not always have to be installed by carrying out a formal installation procedure. Sometimes an application is installed on a device by simply copying the data file or files constituting the application to a desired location on the device. Thus, it should be appreciated that what herein is referred to as the at least one target application installation file 51 sometimes can constitute the actual target application. In such a case, no additional installation procedure may be required after downloading the file(s) 51 and the step of installing the target application is hence carried out by downloading the at least one target installation file 51.

As also well known in the art, an application can be a distributed application comprising a client-side application installed on the user (client) device and a server-side application installed on a server node in a network to which the user device is connected. Thus it should be understood that when stating herein that a target application is installed on an NFC-enabled device this does not necessarily mean that the (part of the) target application installed on the NFC-enabled device is the sole part of the target application. It may also mean that only a small client-side application is installed on the device while a part, or even the main part, of the target application resides in a network node to which the device is connectable. For example, the Application Download server 47 from which the installation file(s) 51 of the target application is downloaded may host a server-side part of the target application. The client-side part of the target application that needs to be downloaded and installed may be a small and simple function forwarding the data content of the Data record 7 in a received Generic Control record 1 to the server-side part of the target application by connecting to an URL that is preprogrammed into the client-side application and attaching the data content in the Data record 7 as URL parameters.

FIG. 4 shows a signaling scheme illustrating how the different system components of the system illustrated in FIG. 3 may be configured to carry out the above described procedure according to an exemplary embodiment of the invention. When describing FIG. 4, simultaneous reference will be made also to the previously described drawings.

Step S401: The source device 23 transmits a Generic Control record 1 including a Target ID 4 to the destination device, which Generic Control record is read by the RTD Handler 13 of the destination device. Here, it is assumed that the Target ID 4 in the received Generic Control record 1 is associated with a target application which does not exist in the destination device.

Step S402: Since the RTD handler 13 cannot find any application that is associated with the Target ID 4, it launches, in this step, the Application Discoverer 17.

Step S403: The Application Discoverer 17 transmits a look-up request including the Target ID 4 to the Look-up server 35, which look-up request is handled by the look-up function 39A of the Look-up server 35. In this embodiment, the Application Discoverer 17 is adapted to include also contextual information 32 about the destination device and/or the user of the destination device, retrieved from the internal register 30A, in the look-up request as described above. The look-up request could, for example, look like this:
www.lookupfunctionX.com?targetID=271&positionX=2223344&positionY=233444&language=swedish Step S404: The look-up function 39A of the Look-up server 35 transmits a database request including the Target ID 4 in the received look-up request to the Application Database server 43 storing the look-up table 45A.

Step S405: The Application Database server 43 hosting the look-up table 45A searches in the look-up table 45A for target URLs that are associated with the Target ID 4 included in the database request.

Step S406: The target URLs associated with the Target ID 4 are returned to the Look-up server 35 in response to the database request. This response can, as mentioned above, be said to constitute a raw matching result of the initial look-up request. In this embodiment it is assumed that the target URLs in the look-up table 45A are associated with application-related information that is descriptive of the target application whose installation file or files 51 are downloadable from the target URLs, and/or that is descriptive of the installation file or files themselves. This application-related information is also included in the response to the database request and hence returned to the Look-up server 35 as a part of the raw matching result.

Step S407: The look-up function 39A of the Look-up server 35 rates the target URLs in the raw matching result by matching the application-related information associated with each target URL with the contextual information 32 of the user/destination device included in the look-up request. The look-up function 39A then removes target URLs with low rating and sorts the remaining target URLs and their associated application-related information in a list sorted by rating. This list can, as also mentioned above, be said to constitute a refined matching result of the initial look-up request.

Step S408: The look-up function 39A of the Look-up server 35 transmits the refined matching result to the Application Discoverer 17 of the destination device in response to the look-up request received in step S403.

Step S409: The Application Discoverer 17 forwards the refined matching result to the GUI 33 of the destination device which presents the result to the user of the device in a suitable way, for example by displaying the result in form of a list comprising the name of the target application whose installation file or files are downloadable from the respective target URL, the rating of the respective target URL, and the application-related information associated with the respective target URL. As mentioned above, this list may be displayed, e.g., using a standard web browser installed on the destination device.

Step S410: In this step, the user of the destination device indicates which target application he/she wants to download (i.e. indicates which target URL the destination device should connect to). This may be achieved in many different ways depending on the user interface of the destination device and what user input means are comprised in or connected to the destination device. For example, the names of the various target applications in the list displayed to the user may be hyperlinks leading to the respective target URL in which case the user may indicate which target application to download by "clicking" on the name of the target application of his/her choice using a keypad or a touch screen of the destination device.

Step S411: The target URL is returned to the Application Discoverer 17.

Step S412: The Application Discoverer 17 submits the target URL and, in this exemplary embodiment, some or all of the application-related information associated with the indicated target URL to the Application Downloader 19.

Step S413: The Application Downloader 19 contacts the Application Download server 47 to check that the server 47 really is hosting the installation file(s) of a valid target application. This can be achieved by the Application Downloader 19 by transmitting an application-validation request to the server 47 using a preferred network connection, asking the server 47 to return any available application-related information being descriptive of the target application and/or the target application installation file(s). Such information may be separately stored in a register in the Application Download server 47 or be derivable from the target application installation file(s). The application-validation request may, for example, ask the server 47 to return any certificate verifying the publisher of the target application, the file size of the target application and/or the target application installation file(s), etc.

Step S414: The Application Download server 47 retrieves, if available, the application-related information requested by the Application Downloader 19 in the application-validation request.

Step S415: The Application Download server 47 returns the requested application-related information to the Application Downloader 19 in response to the application-validation request.

Step S416: The Application Downloader 19 compares the application-related information received from the Application Download server 47 with the application-related information associated with the target URL in the look-up table 45A to check whether these pieces of information correspond to each other. In this example, it is assumed that the application-related information from the Application Download server 47 matches the application-related information from the look-up table 45A and thus that the Application Downloader 19 can validate that the application whose installation file or files 51 are downloadable from the target URL is the desired target application.

Step S417: The Application Downloader 19 transmits a download request to the Application Download server 47 asking permission to download the target application installation file(s) 51.

Step S418: The Application Download server 47 retrieves the target application installation file(s) 51 from the computer readable storage means 49.

Step S419: The Application Download server 47 transmits the target application installation file(s) 51 to the destination device.

Step S420: When the download is complete, the Application Downloader 19 instructs the installation function 29 to install the target application on the destination device using the downloaded installation file(s) 51.

Step S421: The installation function 29 installs the target application using the downloaded installation file(s) 51.

Step S422: The installation function 29 notifies the RTD Handler 13 that the installation of the target application is complete.

Step S423: The RTD Handler 13 instructs the Application Launcher 11 to launch the newly installed target application and to deliver the content of the Data record 7 and, if any, the content of the Action record 5 included in the Generic Control record 1 received in step S401 to the target application.

Step S424: The Application Launcher 11 launches the newly installed target application and delivers the content of the Data record 7 and the content of any Action record 5 included in the Generic Control record 1 to the target application such that the target application can perform the action requested by the Action record 5 on the content in the data record 7.

It should be appreciated that the signaling scheme illustrated in FIG. 4 is only exemplary and that several of the described steps can be removed and/or other steps added to make the procedure more or less sophisticated. For example, the procedure can be made fully automatic by omitting the steps S409 to S411 which allows the end-user to choose which target application to download. Also, as well understood by those skilled in the art, storing application-related information in the look-up table 45A and the Application Download server 47 is advantageous for security reasons but not a requisite in the most straight-forward implementation of the inventive concept. The look-up table 45A may consist of nothing but Target IDs 4 and target URLs associated therewith, in which case the Application Discoverer 17 does not have to be able to retrieve any contextual information 32 about the destination device and/or the user of the destination device to be matched with the application-related information. In this case, the Application Discoverer 17 could be adapted to send only the Target ID 4 in the received Generic Control record 1 to the look-up function 39A, which in turn would retrieve the target URL associated with that Target ID 4 from the look-up table 45A and return said target URL to the Application Discoverer 17. The Application Downloader 19 would then connect to the target URL and download the target application installation file(s) without verifying the validity of the target application, whereupon the target application could be installed on the destination device. From the above it should be understood that any or all of the steps S407, S409-S411, and S413-S416 can be omitted in a simplified embodiment of the invention.

According to another aspect, the end-user can be encouraged to participate more in the installation procedure by, e.g., letting the user participate in the validation of the target application performed in step S416. For example, this can be achieved by displaying both the application-related information retrieved from the look-up table 45A and the application-related information retrieved from the Application Download server 47 in a web browser of the user device and let the user initiate the download of the target application manually by clicking on a button if he/she thinks that the target application that is available for download from the Application Download server 47 is the "correct" target application based on the given information. Furthermore, the end-user can be asked whether the downloaded target application should be installed before step S421 is carried out and/or whether the target application should be launched before step S424 is carried out.

FIG. 5 illustrates an exemplary system 21B for implementation the proposed look-up service according to another embodiment of the invention. System components denoted by the same reference numerals in FIGS. 3 and 5 are the same components having the same technical features unless explicitly stated otherwise.

The system 21B in FIG. 5 differs from the system in FIG. 3 partly in that the destination device is seen to comprise an internal look-up table 45B which, just like the external look-up table 45A residing in the Application Database server 47, stores target IDs 4 and target URLs from which one or several installation files 51 for target applications associated with the target IDs can be downloaded. In the client-side look-up table 45B, each target URLs is also seen to be associated with application-related information that is descriptive of the target application whose installation file or files 51 are downloadable from the target URLs and/or descriptive of the installation file or files 51 themselves, as previously described. The internal look-up table 45B will hereinafter be referred to as the client-side look-up table 45B while a look-up table residing in the Look-up server 35 or any Application Database server 47 to which the Look-up server 35 is communicatively connected will be referred to as a server-side look-up table 45A. The Application Discoverer 17 of the destination device here comprises a client-side look-up function 39B for retrieving data from the client-side look-up table 45B, just like the (server-side) look-up function 39A residing in the Look-up server 35 is responsible for retrieving data from the server-side look-up table(s) 45A. As described above, if more than one target URL is retrieved for a particular Target ID, the server-side look-up function 39A may be adapted to rate the target URLs by matching the application-related information associated with each target URL with the contextual information 32 of the destination device and/or its user. In this embodiment, the client-side look-up function 39B comprises the same or corresponding functionality in order to rate target URLs retrieved from the client-side look-up table 45B and/or the server-side look-up table 45A based on the application-related information associated with each target URL and contextual information 32 of the destination device and/or the user of the destination device. The contextual information 32 can be retrieved by the client-side look-up function 39B directly from the internal register 30A of the destination device and/or from the Look-up server 35 when the Look-up server is adapted to receive such information from a context broker node 57 as will be described in more detail below. It should be understood that the Application Discoverer 17 could comprise functionality for rating target URLs retrieved from the server-side look-up table 45A also when no client-side look-up table 45B is comprised in the destination device. This is advantageous in that it reduces the workload for the Look-up server 35 but may be disadvantageous in that it increases the complexity of the destination device.

By storing a local client-side look-up table 45B in the destination device, the Application Discoverer 17 may be able to retrieve the target URL of a Target ID 4 in a received Generic Control record 1 without the need of looking externally, i.e. without the need of transmitting a look-up request to the Look-up server 35. Of course, however, this requires that the Target ID 4 in a received Generic Control record 1 is listed in the client-side look-up table 45B and is associated with at least one target URL. Therefore, it is important that the client-side look-up table 45B stores at least the Target IDs that are most likely to occur in Generic Control records 1 received by the destination device in the future and for which the proper target application is not yet installed on the destination device. Or, in other words, that the client-side look-up table 45B stores at least the Target IDs that correspond to non-installed target applications which must be installed on the destination device in order to use NFC services that are likely to be demanded by the user of the destination device in the future. Thus, it is important that the system 21B comprises functionality for predicting which NFC services that are likely to be demanded by the end-user in the near future, and for updating the client-side look-up table 45B accordingly.

The Application Discoverer 17 is adapted to update the client-side look-up table 45B by inserting thereto Target IDs and target URLs received by the destination device from the Look-up server 35, which Target IDs and target URLs in turn are retrieved from one or several server-side look-up tables 45A by the Look-up server 35. Which Target IDs and target URLs should be sent to the destination device is determined based on contextual information 32 about the destination device and/or the user of the destination device and the application-related information associated with the target URLs in the server-side look-up table(s) 45A.

According to a first exemplary embodiment, the procedure of updating the client-side look-up table 45B is initiated by the Application Discoverer 17 by transmitting an update request including contextual information 32 retrieved from the internal register 30A to the look-up function 39A of the Look-up server 35. The Application Discoverer 17 may, for example, be adapted to transmit such an update request to the Look-up server 35 at regular time intervals, upon occurrence of a user-triggered event, such as a button-press-event or the like, or when there is an important change in the contextual information 32 in the register 30A. The look-up function 39A in turn compares the contextual information 32 in the update request with the application-related information stored in available server-side look-up tables 45A and retrieves the Target IDs and the target URLs that are associated with application-related information that matches the contextual information. Preferably, also the application-related information is retrieved. This is typically achieved by the look-up function 39A by transmitting a database request to the Application Database server(s) 47 storing the server-side look-up table(s) 45A with the contextual information as argument. As previously described, the contextual information 32 that is included in the update request can include any information about the destination device and/or the user of the destination device, for example positional information provided by a GPS receiver in the destination device. If such positional information indicates that the destination device is located in, e.g., Stockholm, Sweden, the look-up function 39A can retrieve all Target ID/target URL pairs in which the target URL is associated with application-related information indicating that the target application that is downloadable from the target URL is used for an NFC service that is provided in Stockholm, for example a ticketing service provided by the local public transport company in Stockholm. The retrieved Target ID/target URL pairs and preferably also the application-related information associated with the respective pair are then returned to the Application discoverer 17 by the look-up function 39A in response to the update request, whereupon the Application Discoverer 17 updates the client-side look-up table 45A with the received information.

According to a second exemplary embodiment, the procedure of updating the client-side look-up table 45B is not initiated by the Application Discoverer 17 but by the Look-up server 35 itself by pushing Target ID/target URL pairs and preferably also the application-related information associated with the respective pair, retrieved from the server-side look-up table(s) 45A, to the destination device. In comparison with the first embodiment in which the destination device triggers the update, this embodiment potentially and in practice could be less traffic intense since the Look-up server 35 may be configured to only send update messages when updates are available, i.e. when Target ID/target URL pairs not already stored in the client-side look-up table 45B are available in the server-side look-up table(s) 45A. In this scenario, the Application Discoverer 17 is adapted to receive the pushed information and update the client-side look-up table 45B by inserting it thereto.

In order for the Look-up server 35 to select which Target ID/target URL pairs to push to the destination device based on contextual information 32 about the destination device and/or the user of the destination device without receiving such contextual information 32 from the destination device, the Look-up server 35 can be adapted to receive such information 32 from a network node 57 which herein will be referred to as a context broker node 57. The context broker node 57 is located in, or at least connectable to, a network to which the destination device is or may be connected. In this embodiment, in which the destination device is an NFC-enabled mobile phone, the context broker node 57 is connected to a mobile communications network, such as a GSM, UMTS or LTE/SAE network. The context broker node 57 may retrieve the contextual information about the user devices and/or their users from radio base stations 55 in the mobile communications network and/or from other nodes therein. For example, the context broker node 57 can retrieve positional information about a particular user device, e.g. the destination device, by retrieving the Cell ID of the radio base station 55 to which the destination device is connected from the radio base station 57, while receiving the geographical position of the radio base station from the radio base station 57 itself or an OSS (Operation Support System) handling the RAN (Radio Access Network) or the core network of the mobile communications network. Thereby, the context broker node 57 can provide the Look-up server 35 with positional information about the destination device. However, any contextual information that is available in the network, e.g. destination device settings and user preferences, the contact list of the destination device, etc. can be retrieved by the context broker node 57 and forwarded to the Look-up server 35. The contextual information relating to each user device can be stored in a register 30B in the context broker node 57, which register 30B hence can be said to be a network version of the internal register 30A for contextual information 32 of the destination device.

It should be understood that the use of a context broker node is not limited to the case in which the destination device is connected to a mobile communications network. The Look-up server 35 can be adapted to receive contextual information about the destination device from context broker nodes in several different networks, for example from a second context broker node (not shown) in a WMN (Wireless Mesh Network) to which the destination device is connectable via a Wi-Fi hotspot or the like. It should also be understood that the use of context broker nodes 57 in order to provide the Look-up server 35 with contextual information about the destination device and/or the user of the destination device is not limited to the case in which the destination device comprises an updatable client-side look-up table 45B but is applicable also in the scenario described above with reference to FIG. 3.

The context broker can also be attached to other networks that can give information about the destination device and/or its surroundings. For example, the context broker node can be attached to a local positioning network that can give more fine-grained information about the position of the destination device compared to e.g. positioning information based on Cell ID, or to other sensor networks giving information about e.g. the temperature in the vicinity of the destination device.

Of course, the procedure of pushing the update information from the Look-up server 35 to the destination device can be combined with the procedure of initiating the update procedure by transmitting update requests from the destination device. Also, techniques similar to push techniques can be used to update the client-side look-up server 45A. For example, a technique which often is referred to as long polling can be used, in which case the destination device can be adapted to send update requests to the Look-up server 35 while the Look-up server 35 is adapted to respond to the request only when new information that is believed to be useful to the destination device is available in the server-side look-up table(s) 45B.

When the destination device comprises a client-side look-up table 45B which can be updated with information received from the Look-up server 35, the Look-up server is preferably adapted to store a copy of the client-side look-up table in order to know what target ID/target URL pairs are stored therein. This is useful in order for the Look-up server 35 not to repeatedly retransmit Target ID/target URL pairs already stored in the client-side look-up table 45B to the destination device. The Look-up server 35 can be adapted to update the copy of the client-side look-up table 45B each time a new Target ID/target URL pair is sent to the destination device, and/or the destination device can be adapted to include the Target ID/target URL pairs stored in the client-side look-up table 45B when transmitting an update request to the Look-up server 35, whereupon the Look-up server 35 can check that all the Target ID/target URL pairs included in the look-up request are stored also in the copy of the client-side look-up table.

Furthermore, no matter whether the destination device comprises a local client-side look-up table 45B or not, the Look-up server 35 can be adapted to store a respective user profile for the destination device and all other NFC-enabled device to which it can transmit target URLs. The user profiles may comprise a copy of the local client-side look-up table stored in the respective NFC-enabled device, information about which applications are installed on the respective NFC-enabled device, and contextual information about the NFC-enabled device and/or the user of the NFC-enabled device. As described above, such contextual information can be retrieved by the Look-up server 35 either from the NFC-enabled devices themselves or one or several context broker nodes 57 in networks to which the NFC-enabled devices are or may be connected. The Look-up server 35 can be adapted to chose which Target ID/target URL pairs to send to the various NFC-enabled devices based on the information in their user profiles. Furthermore, based on e.g. contact information included in the contextual information about each NFC-enabled device and/or its user, the Look-up server 35 can be adapted to pair together user profiles of NFC-enabled devices belonging to people that seem to know each other. Thereby, the Look-up server 35 can link different user profiles to each other so as to create user profile networks corresponding to social networks among the end-users. This is advantageous in that the Look-up server 35 can determine which Target ID/target URL pairs to send to an NFC-enabled device of a particular end-user based on the applications installed on the NFC-enabled devices of that end-user's friends. If many of the end-user's friends use a particular NFC service, there is a big chance that the end-user also will demand this service in the near future, a demand which hence can be foreseen by the Look-up server 35. This feature can be used by the Look-up server 35 e.g. when rating Target ID/target URL pairs in a raw matching result, and/or when selecting which Target ID/target URL pairs should be sent to an NFC-enabled device to update an internal client-side look-up table stored therein, as described above.

When the destination device comprises a client-side look-up table 45B, the Application Discoverer 17 can be adapted to first try to retrieve the target URL of a Target ID 4 in a received Generic Control record 1 from the client-side look-up table 45B by having the client-side look-up function 39B search the client-side look-up table 45B for a target URL associated with the received Target ID. If no target URL associated with the received Target ID 4 is found, the Application Discoverer 17 can be adapted to provide the received Target ID 4 as input to the server-side look-up table 45A by sending a look-up request to the Look-up server 35. The Look-up server 35 can then retrieve the target URL of the Target ID 4 from the server-side look-up table 45A.

Figure 6:
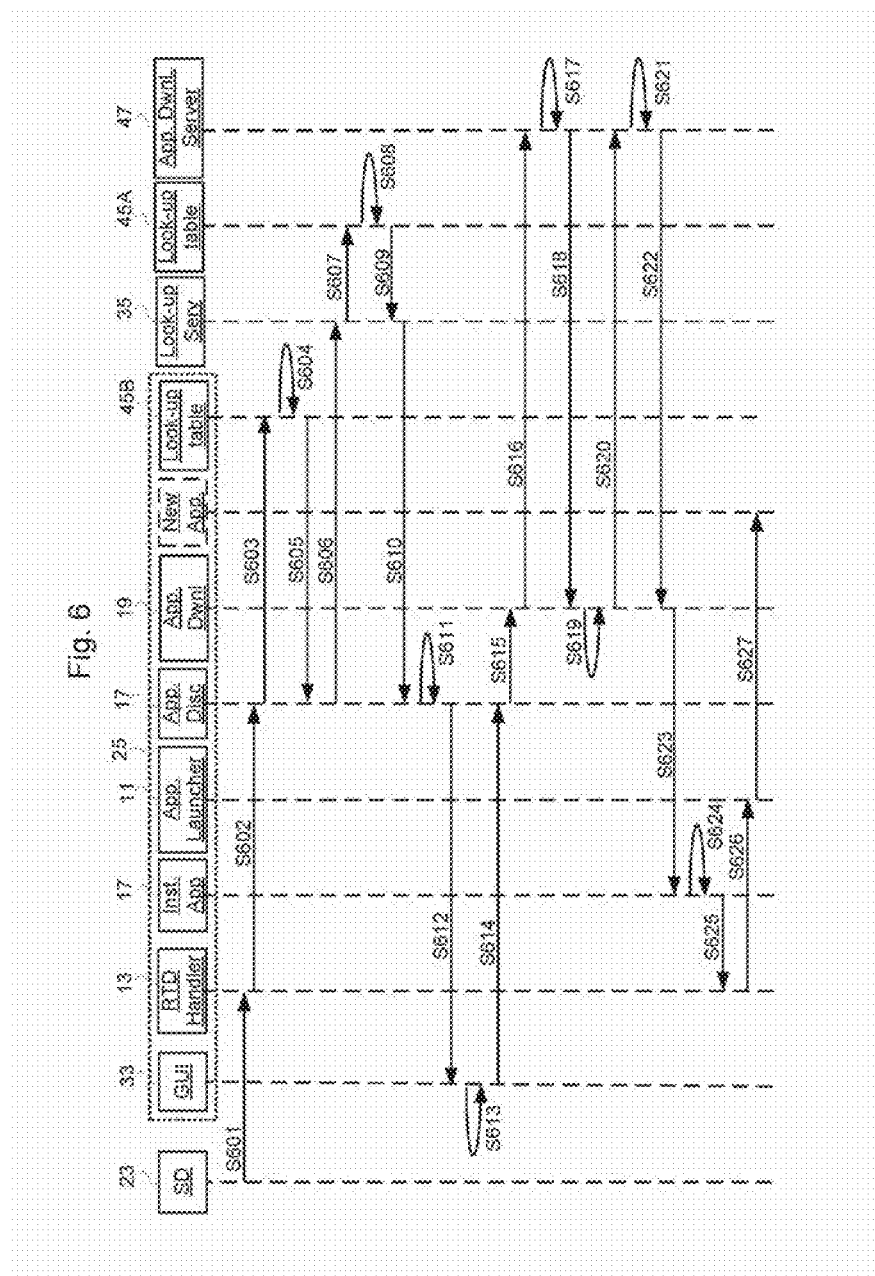
FIG. 6 shows a signaling scheme illustrating how the different system components of the system illustrated in FIG. 5 may be configured to communicate according an exemplary embodiment.

FIG. 6 shows a signaling scheme illustrating how the system components of the system illustrated in FIG. 5 may be configured to carry out the above described process.

Steps S601 and S602 corresponds to steps S401 and S402 in FIG. 4.

In step S603, the client-side look-up function 39B of the Application Discoverer 17 provides the Target ID in the received Generic Control record as input to the client-side look-up table 45B in a database-request.

In step S604, a search for a target URL of the Target ID is performed by traversing the client-side look-up table 45B, which search in this case is assumed to be unsuccessful.

In step S605, the result of the search is returned to the client-side look-up function 39B of the Application Discoverer 17 in response to the database request. If a target URL would have been found in step S604, the target URL and, optionally, any application-related information associated therewith would be included in the response whereupon the next step to be carried out would be step S611. However, when the response indicates that no target URL was found, as is assumed in this exemplary case, the procedure proceeds to step S606.

Steps S606 to S627 correspond to the steps S403 to S424 in FIG. 4 with one single exception. Also in this embodiment it is assumed that the raw matching result returned from the server-side look-up table 45B to the Look-up server in step S609 comprises a plurality of target URLs, each associated with application-related information that is descriptive of the target application whose installation file or files 51 are downloadable from the target URLs, and/or that is descriptive of the installation file or files 51 themselves. However, in this embodiment, the raw matching result is not refined by the server-side look-up function 39A in the Look-up server 35. Instead the raw matching result is directly returned to the Application Discoverer 17 of the destination device in step S610, and the refinement of the raw matching result (rating, sorting and removal of target URLs) is performed by the client-side look-up function 39B of the Application Discoverer 17 in step S611. The same would have been performed if a plurality of target URLs of the Target ID would have been found in the client-side look-up table 45A in step S604.

Figure 7:
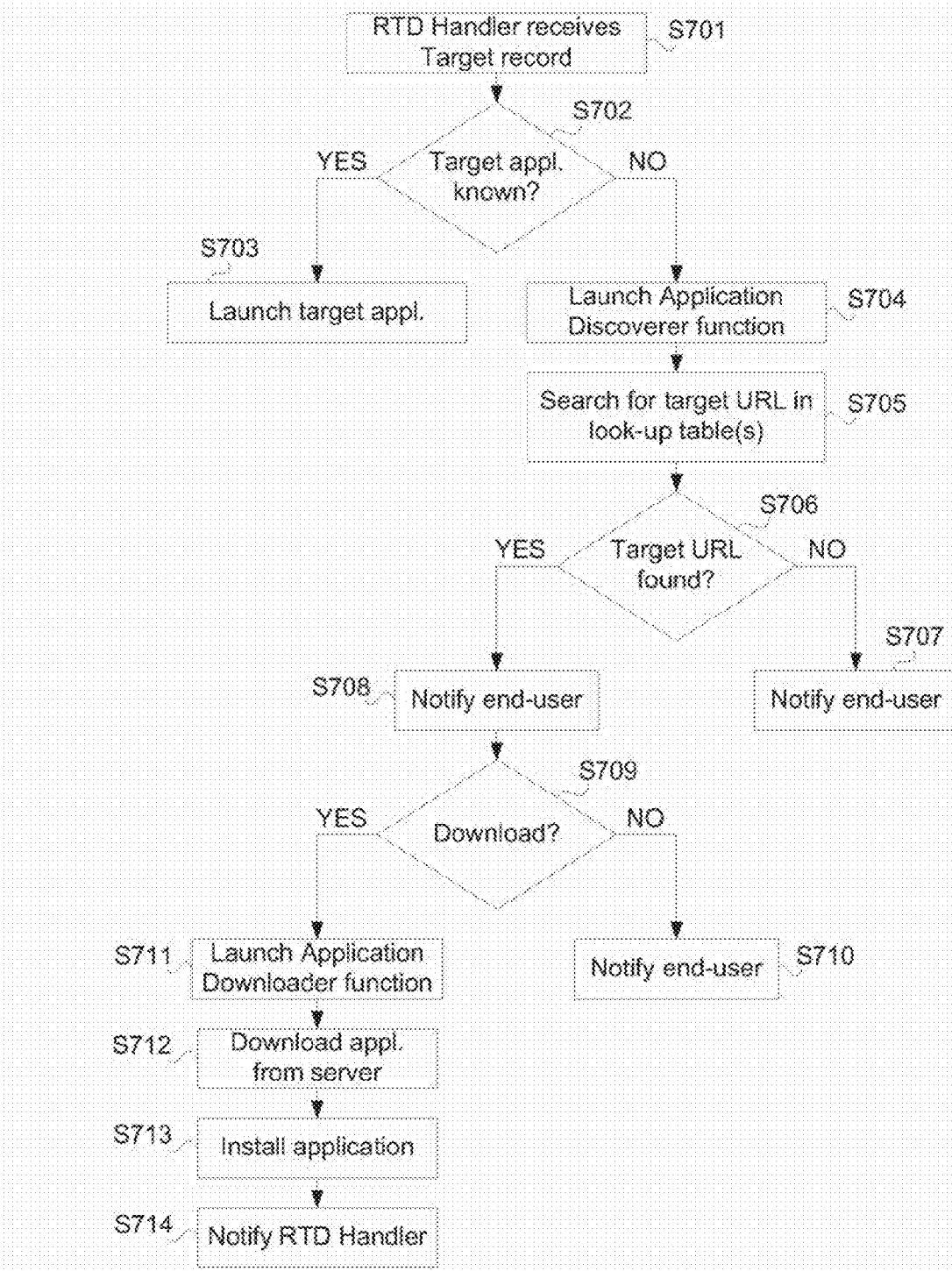
FIG. 7 shows a flowchart illustrating an exemplary embodiment of a method according to the invention.

FIG. 7 shows a flowchart illustrating a basic, exemplary embodiment of the method according to the invention.

Step S701: The RTD Handler 13 of the destination device receives a Target ID 4 comprised in a recently received Generic Control record 1.

Step S702: The RTD Handler 13 tries to identify the target application of the Target ID 4. If the target application is found, the method proceeds to step S703 wherein the target application is launched. If the target application is not found, the method proceeds to step S704.

Step S704: The Application Discoverer 17 is launched.

Step S705: The available look-up table or look-up tables 45A, 45B are traversed in pursuit of at least one target URL of the Target ID 4.

Step S706: If no target URL of the Target ID 4 is found in the look-up table(s) 45A, 45B, the method proceeds to step S707 wherein the end-user, i.e. the user of the destination device, is notified about the negative search result. If, however, at least one target URL of the Target ID 4 is found in the look-up table(s) 45A, 45B, the end-user is notified that a target URL has been found in step S708 whereupon the method proceeds to step S709.

Step S709: The end-user is asked whether he/she wants to download the installation file(s) for the target application from the target URL. If more than one target URL was found in step S706, the end-user is also asked which of the available target applications or target application versions he/she wants to download. If the end-user does not want to download any of the available target applications/target application versions, the method proceeds to step S710 wherein the end-user is notified that the received Generic Control record 1 can not be processed, or, in other words, that the destination device is unable to understand the information received from whatever source device that sent the Generic Control record 1. If, however, the end user chooses to download a target application/a particular target application version, the method proceeds to step S711.

S711: The Application Downloader 19 is launched.

S712: The Application Downloader 19 connects to the chosen target URL and the installation file(s) 51 for the target application is downloaded.

S713: The target application is installed on the destination device using the downloaded installation file(s) 51.

S714: The RTD Handler 13 is notified that the target application is installed on the destination device and ready to be launched.

The invention claimed is:

1. A method for installing an application on a Near-Field Communication (NFC)-enabled device comprising:
   receiving, at the NFC-enabled device, a Generic Control record comprising a Target ID associated with a target application from a source device;
   retrieving at least one target Uniform Resource Identifier (URI) from a look-up table based on the Target ID in the received Generic Control record, wherein the look-up table comprises at least one Target ID associated with one or more target URIs from which at least one installation file for the target application associated with the at least one Target ID can be downloaded, wherein the at least one Target ID in the look-up table corresponds to a plurality of target URIs, wherein at least one of the plurality of target URIs is associated with application-related information descriptive of the target application whose at least one installation file is downloadable from the at least one of the plurality of target URIs and the at least one installation file itself, and wherein retrieving the at least one target URI comprises:
   providing contextual information about at least one of the NFC-enabled device and a user of the NFC-enabled device as input to the look-up table to allow a comparison between the contextual information and the application-related information; and
   retrieving, from the look-up table, the at least one target URI associated with the application-related information which, at least to some extent, matches the contextual information;

downloading, to the NFC-enabled device, the at least one installation file for the target application from the retrieved at least one target URI; and installing the target application on the NFC-enabled device using the at least one installation file for the target application.

2. The method according to claim 1, wherein the look-table comprises a server-side look-up table stored in a Look-up server or a node to which the Look-up server is communicatively connectable.

3. The method according to claim 2, wherein providing the contextual information about at least one of the NFC-enabled device and the user of the NFC-enabled device as input to the look-up table comprises:

retrieving the contextual information about at least one of the NFC-enabled device and the user of the NFC-enabled device from a register within the NFC-enabled device; and sending the contextual information from the NFC-enabled device to the Look-up server to be used as input to the server-side look-up table.

4. The method according to claim 2, wherein the look-up table further comprises a client-side look-up table stored in the NFC-enabled device, and wherein providing the contextual information comprises:

receiving, at the NFC-enabled device, Target IDs and target URIs associated therewith from the Look-up server, wherein the received Target IDs and target URIs have been retrieved by the Look-up server from the server-side look-up table; and updating the client-side look-up table by inserting thereto the Target IDs received from the server-side look-up table and their associated target URIs.

5. The method according to claim 4, wherein providing the contextual information further comprises:

sending, from the NFC-enabled device to the Look-up server, an update request including the contextual information about at least one of the NFC-enabled device and the user of the NFC-enabled device;

wherein receiving Target IDs and target URIs associated therewith from the Look-up server comprises receiving the Target IDs and the target URIs associated therewith selected in the Look-up server based on a comparison between the contextual information and the application-related information in the server-side lookup table.

6. The method according to claim 4, wherein retrieving the at least one target URI from the look-up table based on the Target ID in the received Generic Control record comprises:

attempting to retrieve the at least one target URI from the client-side look-up table by providing the Target ID in the received Generic Control record as input thereto; and if no target URI associated with that Target ID exists in the client-side look-up table, retrieving the at least one target URI from the server-side look-up table by sending a look-up request including the Target ID in the received Generic Control record from the NFC-enabled device to the Look-up server and receiving the at least one target URI from the Look-up server in response thereto.

7. The method according to claim 1, further comprising:

retrieving, from the look-up table, the application-related information associated with the at least one target URI;

receiving, from a download server hosting the at least one target URI, application-related information descriptive of at least one of the target application and the at least one installation file for the target application; and comparing the application-related information retrieved from the look-up table with the application-related information received from the download server;

wherein downloading the at least one installation file for the target application comprises downloading the at least one installation file for the target application if the application-related information retrieved from the look-up table matches, at least to some extent, the application-related information received from the download server.

8. The method according to claim 1, further comprising:

retrieving, from the look-up table, the application-related information associated with the at least one target URI; and displaying, on the NFC-enabled device, the application-related information to the user of the NFC-enabled device in order for the user to determine whether to download the at least one installation file for the target application from the at least one target URI;

wherein downloading the at least one installation file for the target application comprises downloading the at least one installation file for the target application upon detection of a user-triggered event in the NFC-enabled device, and wherein the user-triggered event indicates that the user wants to download the at least one installation file for the target application.

9. A Near-Field Communication (NFC)-enabled device comprising:

an NFC communication circuit configured to receive, from a source device, a Generic Control record comprising a Target ID associated with a target application;

a network communication circuit configured to send data to and receive data from nodes in a network to which the NFC-enabled device is connectable; and an application installer circuit configured to install applications on the NFC-enabled device, wherein the application installer circuit comprises:

an application discoverer circuit configured to retrieve at least one target Uniform Resource Identifier (URI) from a look-up table based on the Target ID in the received Generic Control record, wherein the look-up table comprises at least one Target ID associated with one or more target URIs from which at least one installation file for the target application associated with the at least one Target ID can be downloaded, wherein the at least one Target ID in the look-up table corresponds to a plurality of target URIs, wherein at least one of the plurality of target URIs is associated with application-related information descriptive of the target application whose at least one installation file is downloadable from the at least one of the plurality of target URIs and the at least one installation file itself, and wherein the application discoverer circuit retrieves the at least one target URI by:

retrieving contextual information about at least one of the NFC-enabled device and a user of the NFC-enabled device from a register within the NFC-enabled device;

providing the contextual information as input to the look-up table to allow a comparison between the contextual information and the application-related information; and retrieving, from the look-up table, the at least one target URI associated with application-related information which, at least to some extent, matches the contextual information; and an application downloader circuit configured to download the at least one installation file for the target application from the retrieved at least one target URI;
wherein the application installer circuit is further configured to install the target application on the NFC-enabled device using the at least one installation file for the target application.

10. The NFC-enabled device according to claim 9, wherein the look-table comprises a server-side look-up table stored in a Look-up server or a node to which the Look-up server is communicatively connectable, and wherein the application discoverer circuit is further configured to provide the contextual information as input to the server-side look-up table by sending the contextual information from the NFC-enabled device to the Look-up server.

11. The NFC-enabled device according to claim 9, wherein the look-up table comprises both a server-side look-up table stored in a Look-up server or a node to which the Look-up server is communicatively connectable, and a client-side look-up table stored in the NFC-enabled device, wherein the network communication circuit is further configured to receive Target IDs and target URIs associated therewith from the Look-up server, and wherein the application discoverer circuit is further configured to update the client-side look-up table by inserting thereto the Target IDs received from the server-side look-up table and their associated target URIs.

12. The NFC-enabled device according to claim 11, wherein the application discoverer circuit is further configured to:
   send an update request including the contextual information about at least one of the NFC-enabled device and the user of the NFC-enabled device to the Look-up server;
   wherein the network communication circuit receives Target IDs and target URIs associated therewith selected from the Look-up server in response to the update request based on a comparison between the contextual information and the application-related information in the server-side lookup table; and
   wherein the application discoverer circuit updates the client-side look-up table by inserting thereto the Target IDs and their associated target URIs received in response to the update request.

13. The NFC-enabled device according to claim 11, wherein the application discoverer circuit is further configured to retrieve the at least one target URI by attempting to retrieve the at least one target URI associated with the Target ID in the received Generic Control record from the client-side look-up table, and, if no target URI associated with the Target ID in the received Generic Control record exists in the client-side look-up table, send a look-up request including the Target ID in the received Generic Control record to the Look-up server and receive the at least one target URI from the Look-up server in response thereto.

14. The NFC-enabled device according to claim 9,
   wherein the application discoverer circuit is further configured to retrieve, from the look-up table, the application-related information associated with the at least one target URI,
   wherein the application downloader circuit is further configured to retrieve application-related information descriptive of at least one of the target application and the at least one installation file for the target application from a download server hosting the at least one target URI, and compare the application-related information retrieved from the look-up table with the application-related information retrieved from the download server, and wherein the application discoverer circuit downloads the at least one installation file for the target application by downloading the at least one installation file for the target application from the download server if the application-related information retrieved from the look-up table matches, at least to some extent, the application-related information retrieved from the download server.

15. The NFC-enabled device according to claim 9,
   wherein the application discoverer circuit is further configured to retrieve, from the look-up table, the application-related information associated with the at least one target URI,
   wherein the NFC-enabled device further comprises a display configured to display the application-related information to the user of the NFC-enabled device in order for the user to determine whether to download the at least one installation file for the target application from the at least one target URI, and
   wherein the application downloader circuit is further configured to download the at least one installation file for the target application by downloading the at least one installation file for the target application upon occurrence of a user-triggered event in the NFC-enabled device, and wherein the user-triggered event indicates that the user wants to download the at least one installation file for the target application.

16. A computer program comprising non-transitory computer readable code stored in a non-transitory computer-readable medium, wherein the non-transitory computer readable code, when run on a Near-Field Communication (NFC)-enabled device, cause the NFC-enabled device to:
   receive a Generic Control record comprising a Target ID associated with a target application from a source device;
   retrieve at least one target Uniform Resource Identifier (URI) from a look-up table based on the Target ID in the received Generic Control record, wherein the look-up table comprises at least one Target ID associated with one or more target URIs from which at least one installation file for the target application associated with the at least one Target ID can be downloaded, wherein the at least one Target ID in the look-up table corresponds to a plurality of target URIs, wherein at least one of the plurality of target URIs is associated with application-related information descriptive of the target application whose at least one installation file is downloadable from the at least one of the plurality of target URIs and the at least one installation file itself, and wherein retrieving the at least one target URI comprises:
      providing contextual information about at least one of the NFC-enabled device and a user of the NFC-enabled device as input to the look-up table to allow a comparison between the contextual information and the application-related information; and
      retrieving, from the look-up table, the at least one target URI associated with the application-related information which, at least to some extent, matches the contextual information;
   download the at least one installation file for the target application from the retrieved at least one target URI; and
   install the target application on the NFC-enabled device using the at least one installation file for the target application.

17. A computer program comprising non-transitory computer readable code stored in a non-transitory computer-readable medium, wherein the non-transitory computer readable code, when run on a server computer, cause the server computer to:

receive a look-up request including a Target ID associated with a target application from a Near-Field Communication (NFC)-enabled device;

retrieve at least one target Uniform Resource Identifier (URI) from a look-up table based on the Target ID in the received look-up request, wherein the look-up table comprises at least one Target ID associated with one or more target URIs from which at least one installation file for the target application associated with the at least one Target ID can be downloaded; and send the retrieved at least one target URI to the NFC-enabled device, wherein the look-up request includes contextual information about at least one of the NFC-enabled device and a user of the NFC-enabled device, wherein the at least one Target ID in the look-up table corresponds to a plurality of target URIs, wherein at least one of the plurality of target URIs is associated with application-related information about the target application whose at least one installation file is downloadable from the at least one of the plurality of target URIs and the at least one installation file itself, and wherein the computer program is configured to control the server computer to select which of the plurality of target URIs to send to the NFC-enabled device based on a comparison between the contextual information and the application-related information in the look-up table.

18. The computer program according to claim 17, wherein the server computer is disposed in a server node configured to send data to and receive data from nodes in a network to which the server node is connectable.

* * * * *